United States Patent
Von Novak, III et al.

(10) Patent No.: US 10,128,688 B2
(45) Date of Patent: Nov. 13, 2018

(54) SYSTEMS AND METHODS FOR LIMITING VOLTAGE IN WIRELESS POWER RECEIVERS

(71) Applicant: QUALCOMM INCORPORATED, San Diego, CA (US)

(72) Inventors: William H. Von Novak, III, San Diego, CA (US); Joseph L. Archambault, San Diego, CA (US); Adam Jason Wood, San Diego, CA (US); Edward Kenneth Kallal, San Diego, CA (US); Ryan Tseng, Coronado, CA (US); Gabriel Isaac Mayo, North Potomac, MD (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/261,496

(22) Filed: Sep. 9, 2016

(65) Prior Publication Data

US 2017/0126066 A1    May 4, 2017

Related U.S. Application Data

(63) Continuation of application No. 13/622,204, filed on Sep. 18, 2012, now Pat. No. 9,508,487.

(51) Int. Cl.
*H01F 37/00* (2006.01)
*H02J 50/12* (2016.01)
(Continued)

(52) U.S. Cl.
CPC .............. *H02J 50/12* (2016.02); *H01F 38/14* (2013.01); *H02J 5/005* (2013.01); *H02J 7/025* (2013.01);
(Continued)

(58) Field of Classification Search
CPC .. H02J 50/12; H02J 50/20; H02J 50/40; H02J 50/80; H02J 50/90; H02J 7/025
(Continued)

(56) References Cited

U.S. PATENT DOCUMENTS 7,535,362 B2   5/2009   Moser et al.
8,723,367 B2   5/2014   Ishibashi
(Continued)

FOREIGN PATENT DOCUMENTS

CN   1178407 A   4/1998
GB   2465678 A   6/2010
(Continued)

OTHER PUBLICATIONS

International Search Report and Written Opinion—PCT/US2012/060626—ISA/EPO—dated Feb. 5, 2013.

*Primary Examiner* — Hal Kaplan
(74) *Attorney, Agent, or Firm* — Knobbe, Martens, Olson & Bear, LLP

(57) ABSTRACT

This disclosure provides systems, methods, and apparatus for the limiting of voltage in wireless power receivers. In one aspect, an apparatus includes a power transfer component configured to receive power wirelessly from a transmitter. The apparatus further includes a circuit coupled to the power transfer component and configured to reduce a received voltage when activated. The apparatus further includes a controller configured to activate the circuit when the received voltage reaches a first threshold value and configured to deactivate the circuit when the received voltage reaches a second threshold value. The apparatus further includes an antenna configured to generate a signal to the transmitter that signals to the transmitter that the received voltage reached the first threshold value.

20 Claims, 15 Drawing Sheets

Related U.S. Application Data

(60) Provisional application No. 61/591,201, filed on Jan. 26, 2012, provisional application No. 61/550,173, filed on Oct. 21, 2011.

(51) Int. Cl.

| | | |
|---|---|---|
| *H02J 50/80* | (2016.01) | |
| *H01F 38/14* | (2006.01) | |
| *H04B 5/00* | (2006.01) | |
| *H02J 5/00* | (2016.01) | |
| *H02J 7/02* | (2016.01) | |
| *H02J 50/90* | (2016.01) | |
| *H02J 50/20* | (2016.01) | |
| *H02J 50/40* | (2016.01) | |

(52) U.S. Cl.
CPC .............. *H02J 50/20* (2016.02); *H02J 50/40* (2016.02); *H02J 50/80* (2016.02); *H02J 50/90* (2016.02); *H04B 5/0037* (2013.01)

(58) Field of Classification Search
USPC .......................................................... 307/104
See application file for complete search history.

(56) References Cited

U.S. PATENT DOCUMENTS

| | | | |
|---|---|---|---|
| 8,772,977 | B2 | 7/2014 | Urano |
| 2008/0079392 | A1 | 4/2008 | Baarman et al. |
| 2008/0303479 | A1 | 12/2008 | Park et al. |
| 2009/0080128 | A1 | 3/2009 | Tsuchihashi |
| 2010/0052869 | A1 | 3/2010 | Stewart |
| 2010/0084467 | A1 | 4/2010 | Nishido |
| 2010/0146308 | A1 | 6/2010 | Gioscia et al. |
| 2010/0194345 | A1 | 8/2010 | Li |
| 2011/0053500 | A1 | 3/2011 | Menegoli et al. |
| 2011/0062793 | A1 | 3/2011 | Azancot et al. |
| 2011/0156488 | A1 | 6/2011 | Kuroda |
| 2011/0193420 | A1 | 8/2011 | Ishida et al. |
| 2011/0215756 | A1 | 9/2011 | Shimizu |
| 2012/0025622 | A1 | 2/2012 | Kim et al. |
| 2012/0050931 | A1 | 3/2012 | Terry et al. |
| 2012/0193993 | A1 | 8/2012 | Azancot et al. |
| 2013/0009483 | A1 | 1/2013 | Kawate et al. |
| 2013/0099585 | A1 | 4/2013 | Von Novak et al. |
| 2014/0063666 | A1 | 3/2014 | Kallal et al. |

FOREIGN PATENT DOCUMENTS

| | | |
|---|---|---|
| JP | 2005354888 A | 12/2005 |
| JP | 2009295699 A | 12/2009 |
| JP | 2010035408 A | 2/2010 |
| JP | 2010505379 A | 2/2010 |
| JP | 2010108485 A | 5/2010 |
| JP | 2010183825 A | 8/2010 |
| JP | 2011514801 A | 5/2011 |
| JP | 2011130474 A | 6/2011 |
| WO | WO-2008038203 A2 | 4/2008 |
| WO | WO-2008044875 A1 | 4/2008 |
| WO | WO-2010119772 A1 | 10/2010 |
| WO | 2011028956 A2 | 3/2011 |

SYSTEMS AND METHODS FOR LIMITING VOLTAGE IN WIRELESS POWER RECEIVERS

CROSS-REFERENCE TO RELATED APPLICATIONS

This application is a continuation of U.S. application Ser. No. 13/622,204, filed Sep. 18, 2012, which claims priority under 35 U.S.C. § 119(e) to U.S. Provisional Patent Application No. 61/591,201, entitled "SYSTEMS AND METHODS FOR LIMITING VOLTAGE IN WIRELESS POWER RECEIVERS," filed on Jan. 26, 2012; and to U.S. Provisional Patent Application No. 61/550,173, entitled "INTEGRATED SIGNALING AND PROTECTION FOR WIRELESS POWER SYSTEM," filed on Oct. 21, 2011; the entire contents of each of which is herewith incorporated by reference.

FIELD

The present invention relates generally to wireless power. More specifically, the disclosure is directed to limiting voltage in wireless power receivers.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus to receive power wirelessly from a transmitter. The apparatus comprises a power transfer component configured to receive power wirelessly from the transmitter. The apparatus further comprises a circuit coupled to the power transfer component, the circuit configured to reduce a received voltage when activated. The apparatus further comprises a controller configured to activate the circuit when the received voltage reaches a first threshold value and configured to deactivate the circuit when the received voltage reaches a second threshold value. The apparatus further comprises an antenna configured to generate a signal received by the transmitter that signals to the transmitter that the received voltage reached the first threshold value.

Another aspect of the disclosure provides a method for limiting voltage in a wireless power receiver. The method comprises receiving power wirelessly from a transmitter. The method further comprises measuring a value of a received voltage. The method further comprises activating a circuit when the received voltage reaches a first threshold value, the circuit configured to reduce the received voltage. The method further comprises generating a pulse received by the transmitter when the circuit is activated that signals to the transmitter that the received voltage reached the first threshold value. The method further comprises deactivating the circuit when the received voltage reaches a second threshold value.

Another aspect of the disclosure provides an apparatus configured to limit voltage in a wireless power receiver. The apparatus comprises means for receiving power wirelessly from a transmitter. The apparatus further comprises means for measuring a value of a received voltage. The apparatus further comprises means for activating a circuit when the received voltage reaches a first threshold value, the circuit configured to reduce the received voltage. The apparatus further comprises means for generating a pulse received by the transmitter when the circuit is activated that signals to the transmitter that the received voltage reached the first threshold value. The apparatus further comprises means for deactivating the circuit when the received voltage reaches a second threshold value.

Another aspect of the disclosure provides a non-transitory computer-readable medium comprising code that, when executed, causes an apparatus to receive power wirelessly from a transmitter. The medium further comprises code that, when executed, causes the apparatus to measure a value of a received voltage. The medium further comprises code that, when executed, causes the apparatus to activate a circuit when the received voltage reaches a first threshold value, the circuit configured to reduce the received voltage. The medium further comprises code that, when executed, causes the apparatus to generate a pulse received by the transmitter when the circuit is activated that signals to the transmitter that the received voltage reached the first threshold value. The medium further comprises code that, when executed, causes the apparatus to deactivate the circuit when the received voltage reaches a second threshold value.

Figure 1:
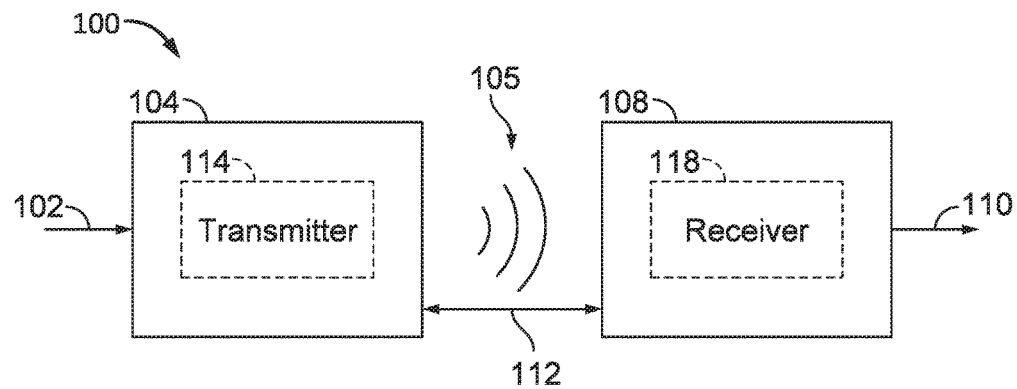
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
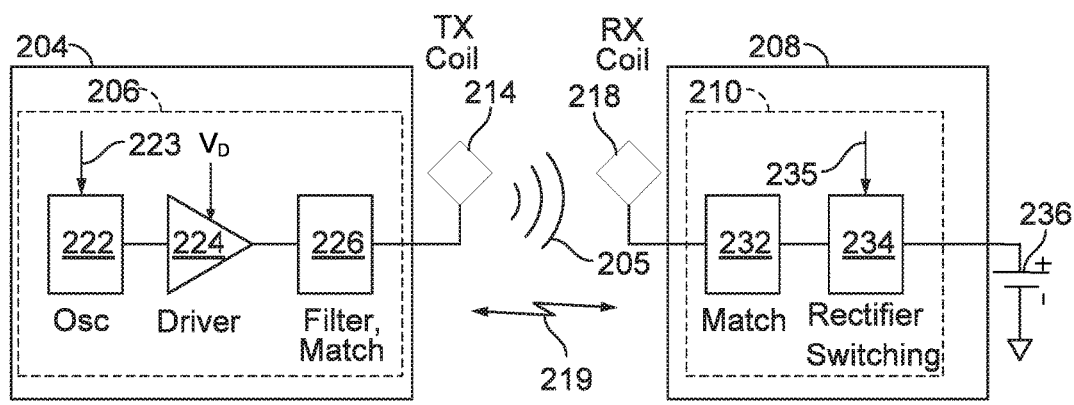
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
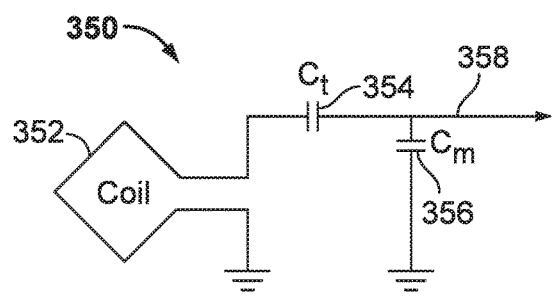
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 354 and capacitor 356 may be added to the transmit or receive circuitry 350 to create a resonant circuit that selects a signal 358 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 352. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
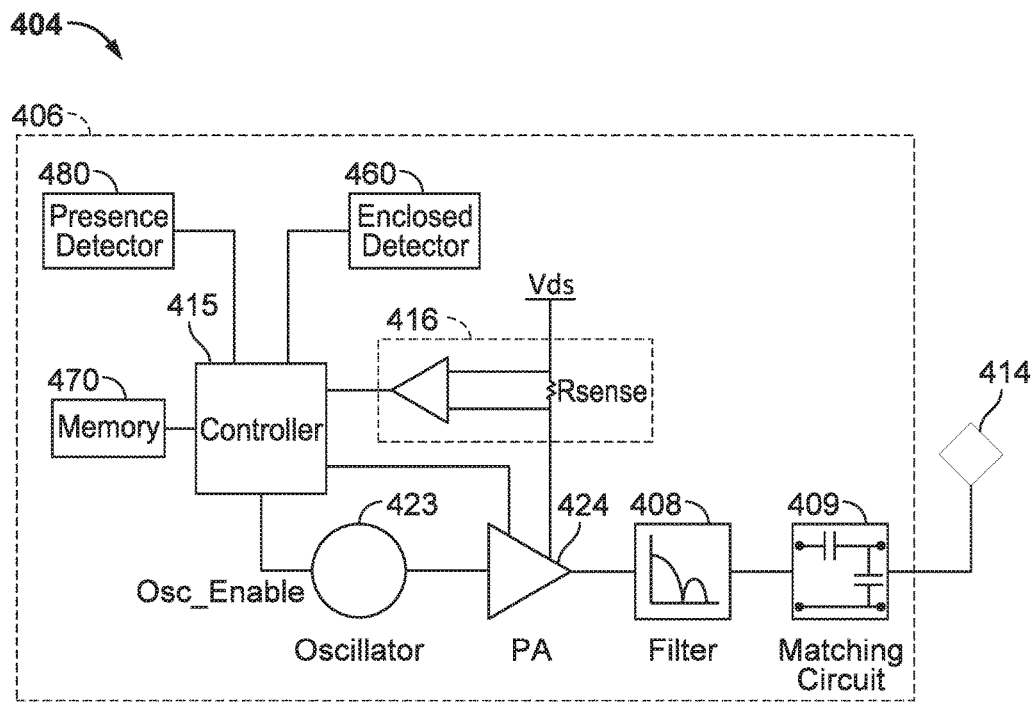
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. FIG. 4 further shows that transmit circuitry 406 includes a memory 470. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
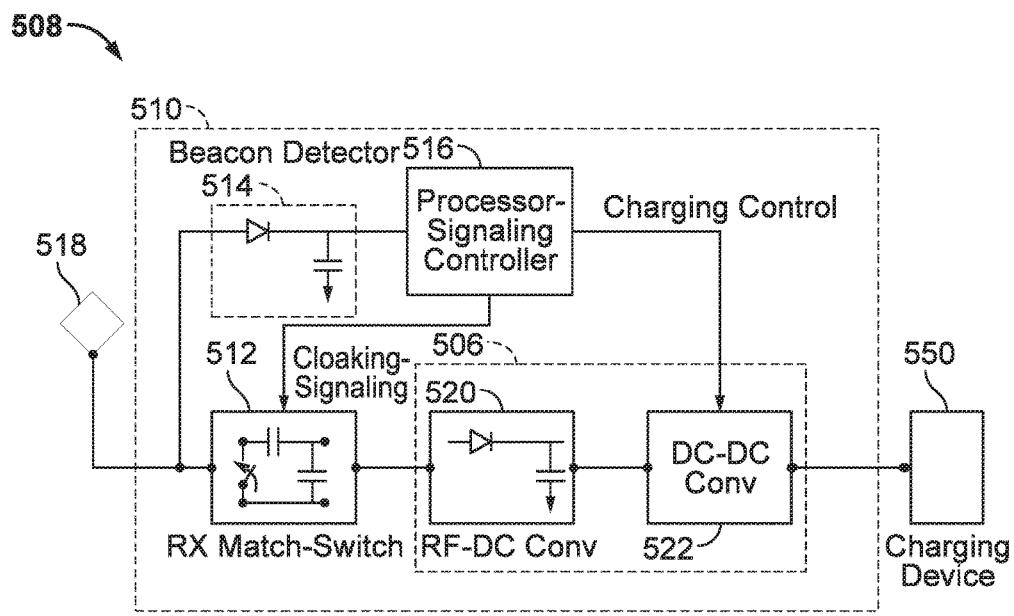
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also include a DC-to-DC converter 522. RF-to-DC converter 520 rectifies the RF energy signal received at receive coil 518 into a non-alternating power with an output voltage represented by $V_{reg}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
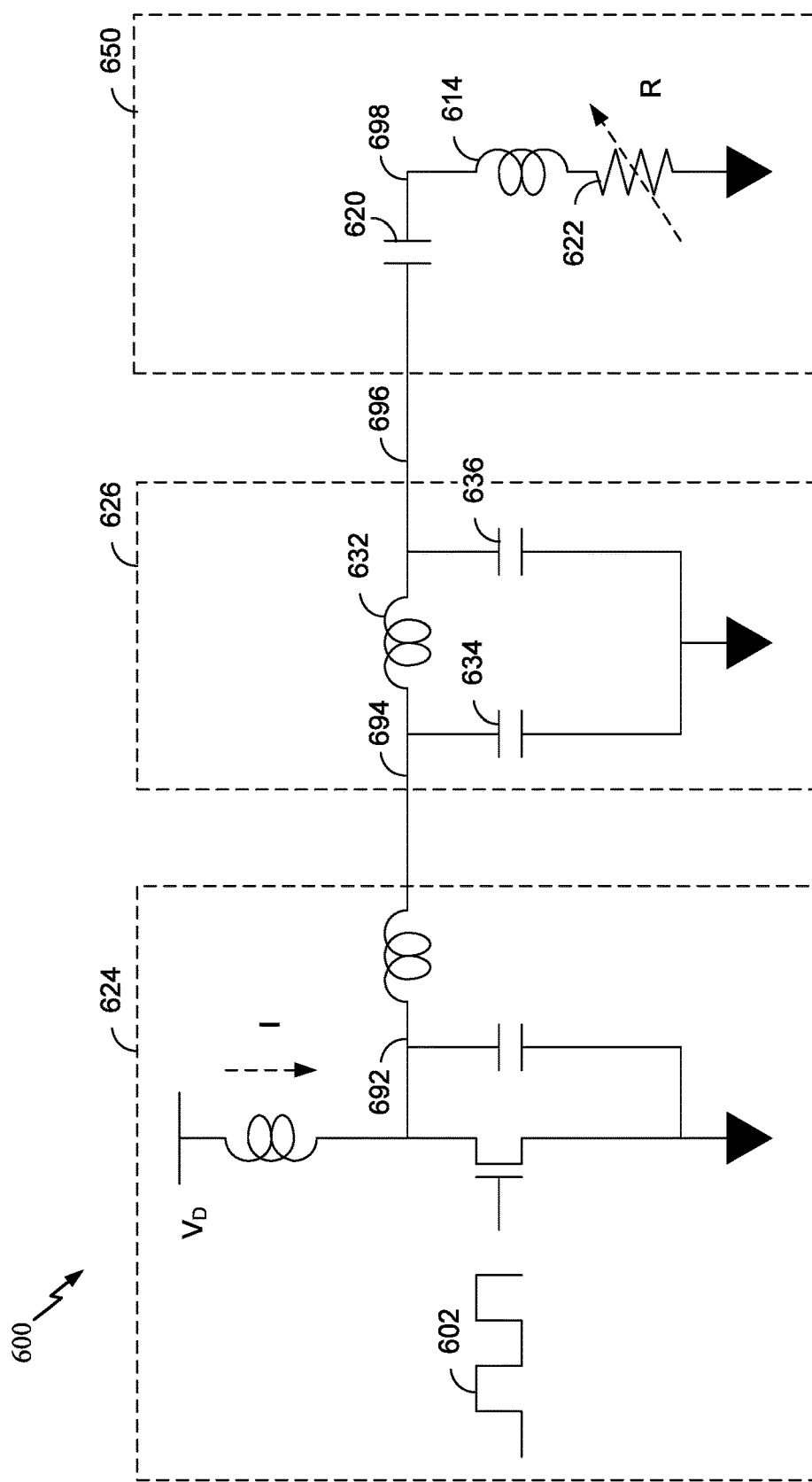
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Figure 7:
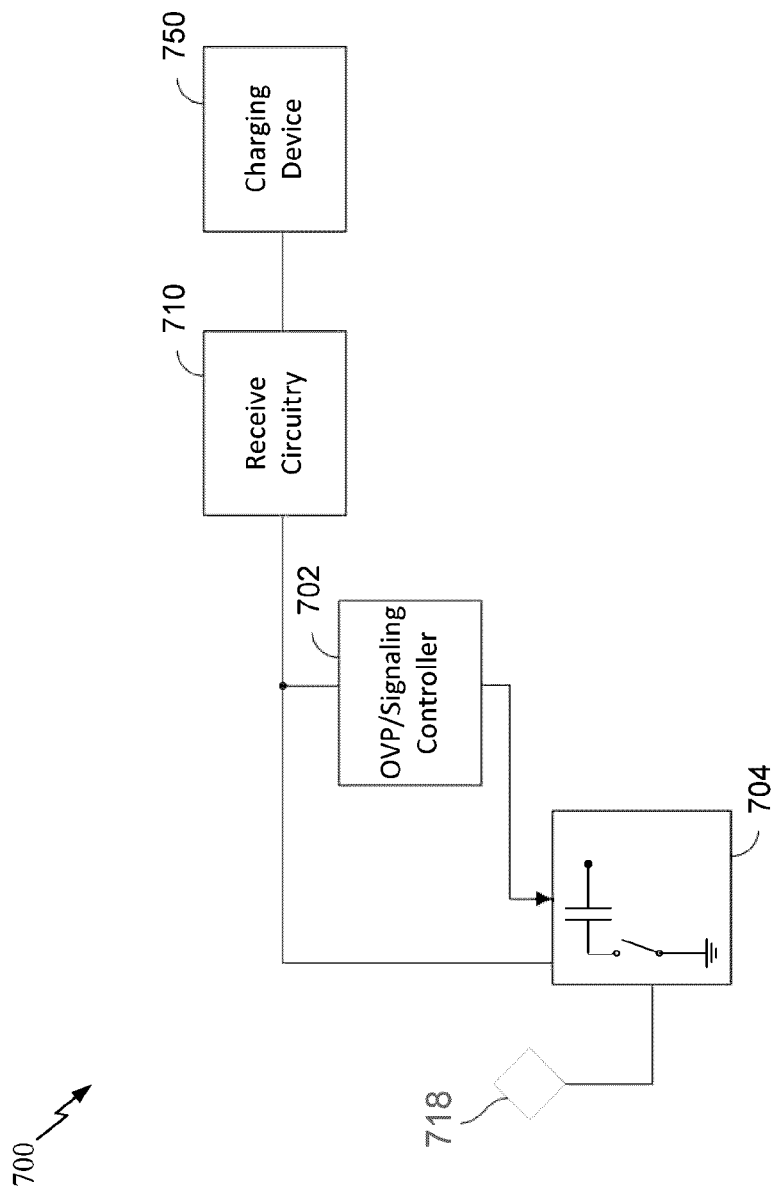
FIG. 7 is a functional block diagram of a receiver that may be used in the wireless power transfer system of FIG. 1, in accordance with exemplary embodiments of the invention.

FIG. 7 is a functional block diagram of a receiver 700 that may be used in the wireless power transfer system of FIG. 1, in accordance with exemplary embodiments of the invention. The receiver 700 includes receive circuitry 710 that may include a receive coil 718. The receiver 700 may further include switching and signaling circuitry 704 and Over Voltage Protection (OVP)/signaling controller 702. Receiver 700 further couples to charging device 750 for providing received power thereto. In some embodiments, receive coil 718 may be similar to receive coil 518 of FIG. 5, receive circuitry 710 may be similar to receive circuitry 510 of FIG. 5, and charging device 750 may be similar to charging device 550 of FIG. 5. It should be noted that receive circuitry 710 is illustrated as being external to charging device 750 but may be integrated into charging device 750. Energy may be propagated wirelessly to receive coil 718 and then coupled through the rest of the switching and signaling circuitry 704 and the receive circuitry 710 to charging device 750. By way of example, the charging device 750 may include devices such as mobile phones, portable music players, laptop computers, tablet computers, computer peripheral devices, communication devices (e.g., Bluetooth devices), digital cameras, hearing aids (and other medical devices), and the like.

Receive coil 718 may be tuned to resonate at the same frequency, or within a specified range of frequencies, as transmit coil 414 (FIG. 4). Receive coil 718 may be similarly dimensioned with transmit coil 414 or may be differently sized based upon the dimensions of the associated charging device 750. By way of example, device 750 may be a portable electronic device having diametric or length dimension smaller that the diameter of length of transmit coil 414. In such an example, receive coil 718 may be implemented as a multi-turn coil in order to reduce the capacitance value of a tuning capacitor (not shown) and increase the receive coil's impedance. By way of example, receive coil 718 may be placed around the substantial circumference of charging device 750 in order to maximize the coil diameter and reduce the number of loop turns (i.e., windings) of the receive coil 718 and the inter-winding capacitance.

Switching and signaling circuitry 704 may function to protect the receive circuitry 710 from high voltages induced on receive coil 718 by a transmitter, such as transmitter 204 of FIG. 2. Switching and signaling circuitry 704 may also function to notify the transmitter of the overvoltage condition so that the transmitter can remove the overvoltage condition. As an example, when an overvoltage condition is detected, switching and signaling circuitry 704 may activate switches to clamp the receiver 700 and change the circuit's impedance to reduce current flow. In addition, switching and signaling circuitry 704 may generate pulses that are transmitted to the transmitter and/or detune the receiver 700 (e.g., via linear or digital detuning) to notify the transmitter that the overvoltage condition has occurred. Switches may be turned on and off according to a pulse width modulation process to generate the pulses. As described herein, switching and signaling circuitry 704 may also be referred to as a voltage decay circuit.

OVP/signaling controller 702 may function to measure a voltage received by receiver 700 to determine whether the overvoltage condition has occurred. OVP/signaling controller 702 may also determine when the overvoltage condition has passed. In some embodiments, OVP/signaling controller 702 may also control the switches of switching and signaling circuitry 704 to generate the appropriate messages to be sent to the transmitter. OVP/signaling controller 702 and switching and signaling circuitry 704 are discussed in more detail with respect to FIG. 8A.

Figure 8A:
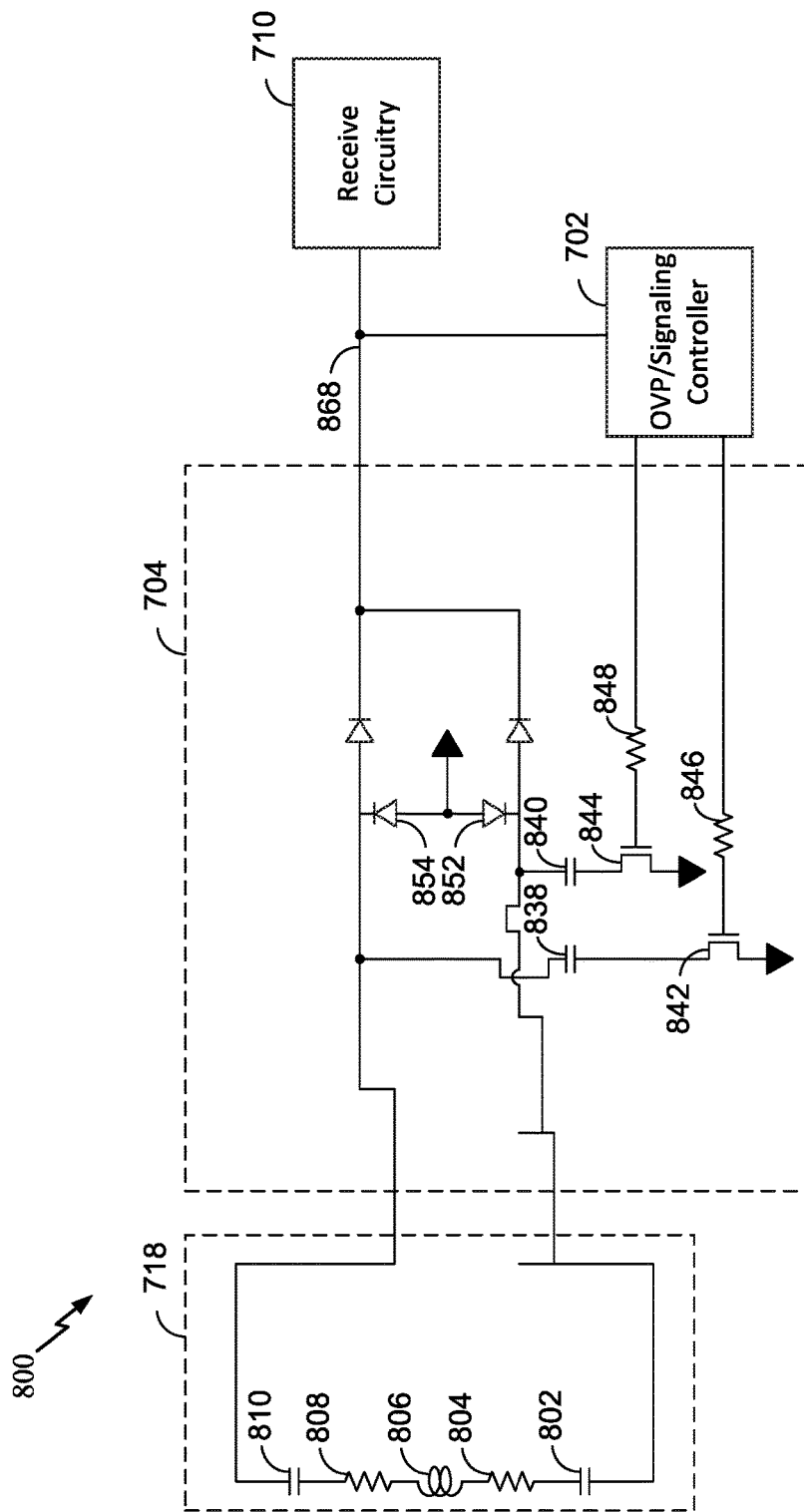
FIG. 8A is a schematic diagram of a receiver with a portion of a receive coil and a switching and signaling circuitry that may be used in the receiver of FIG. 7.

FIG. 8A is a schematic diagram of a receiver 800 with a portion of receive coil 718 and switching and signaling circuitry 704 that may be used in the receiver 700 of FIG. 7. While receive coil 718 is illustrated as including capacitors 802 and 810, resistors 804 and 808, and inductor 806, this configuration is not meant to be limiting as it should be apparent to one skilled in the art that receive coil 718 may be designed in several different ways to achieve the functionality of a receive coil as described above. Likewise, while switching and signaling circuitry 714 is illustrated as including capacitors 838 and 840, resistors 846 and 848, transistors 842 and 844, and diodes 852 and 854, this configuration is not meant to be limiting as it should be apparent to one skilled in the art that switching and signaling circuitry 704 may be designed in several different ways to achieve the functionality of a switching and signaling circuitry as described herein.

In an embodiment, receive coil 718 may receive power wirelessly from a transmitter. During an initial state, OVP/signaling controller 702 may output a low signal such that transistors 842 and/or 844, which act like switches, change the impedance of the receiver and/or allow less current to pass. In other words, transistors 842 and/or 844 may be in an off state. The current may pass through the rest of switching and signaling circuitry 704 and reach node 868. OVP/signaling controller 702 may be configured to measure a voltage at node 868 and compare this voltage to threshold voltage values. As an example, OVP/signaling controller 702 may include a comparator (not shown) to compare the voltage at node 868 with a threshold voltage value. These threshold voltage values may be predetermined or based on the conditions of receiver 800. One threshold voltage value may be an overvoltage threshold value, which is a voltage at which the receiver 800 would be in an overvoltage condition. For example, if the voltage at node 868 is equal to or greater than the overvoltage threshold value, then the receiver 800 may be in an overvoltage condition and the transistors 842 and/or 844 may be transitioned to an on state. The overvoltage threshold value may be 26V.

Another threshold value may be a minimum overvoltage threshold value, which is a voltage at which the receiver 800 could open the clamps such that transistors 842 and/or 844 are again in an off state. The minimum overvoltage threshold value may be equal to or greater than the voltage necessary for the receiver 800 to operate in a steady state. In some instances, it may be desirable to set the minimum overvoltage threshold value to be greater than the voltage necessary for the receiver 800 to operate in a steady state to account for any delays that may occur when the receiver 800 switches the transistors 842 and/or 844 from an on state to an off state. Note that the receiver 800 may still be in an overvoltage condition even if the minimum overvoltage threshold value has been reached. A time that it takes a voltage at node 868 to drop from the overvoltage threshold value to the minimum overvoltage threshold value may not be of a sufficient duration to allow the receiver 800 to notify the transmitter that it is in an overvoltage condition. The receiver 800 may remain in an overvoltage condition until the transmitter receives notification that the receiver 800 is in an overvoltage condition and reduces and/or removes a power transmitted to the receiver 800. For example, if the voltage at node 868 is equal or less than the minimum overvoltage threshold value, while the receiver 800 may or may no longer be in an overvoltage condition, the receiver 800 may open the clamps to allow a voltage at node 868 to increase. Note, however, that if the receiver 800 is already operating in a normal configuration (i.e. an overvoltage condition does not currently exist), then the minimum overvoltage threshold value may be ignored for the purposes of altering a configuration of the receiver 800. The minimum overvoltage threshold value may be 12V.

In an embodiment, if the voltage at node 868 is equal to or exceeds the overvoltage threshold value, then the OVP/ signaling controller 702 may function to clamp the receiver 800 by activating the transistors 842 and/or 844 such that the transistors 842 and/or 844 change an impedance of the receiver 800 and/or allow current to pass (i.e. the transistors 842 and/or 844 are in an on state). Activating transistors 842 and/or 844 may cause the voltage at node 868 to decrease. Once the voltage at node 868 reaches the minimum overvoltage threshold value, OVP/signaling controller 702 may deactivate transistors 842 and/or 844. As described herein, deactivating transistors 842 and/or 844 may prevent the voltage at node 868 from becoming too low. In some embodiments, the voltage at node 868 may begin to rise again and the process of activating transistors 842 and/or 844 when the voltage reaches the overvoltage threshold value may be repeated. In this way, the voltage at node 868, an input of receive circuitry 710, may oscillate between acceptable voltage levels. Receive circuitry 710 may then be able to operate despite overvoltage conditions.

Note that transistors 842 and/or 844 may serve two or more functions. In addition to decaying a received voltage when activated, transistors 842 and/or 844 may also be used to generate impedance change signals. In an embodiment, OVP/signaling controller 702 may concurrently activate and deactivate transistors 842 and/or 844 based on a voltage at node 868 and activate and deactivate transistors 842 and/or 844 to periodically generate pulses for transmission to a transmitter. The transistors 842 and/or 844 may be activated and deactivated according to a pulse width modulation process. The pulses may indicate to the transmitter whether the receiver is or is not in an overvoltage condition. Based on this information, the transmitter may act accordingly. For example, the transmitter may reduce a power level of the power transmitter to the receiver 800. In some embodiments, the transmitter may stop transmitting power to the receiver 800. Once the transmitter acts to reduce or stop transmitting power to the receiver 800, then the receiver 800 may no longer be in an overvoltage condition. In other embodiments, the receiver 800 may indicate to the transmitter that it is in an overvoltage condition by, for example, sending a signal over another communication channel, such as a 2.4 GHz communication channel (e.g., an out-of-band communication using Bluetooth, RF, etc.). The receiver 800 may include an antenna, not shown, separate from the receive coil 718 and coupled to the OVP/signaling controller 702, and the signal sent over another communication channel may be transmitted using the antenna of the receiver 800. The transmitter may include an antenna, not shown, similar to the antenna of the receiver 800 to receive the out-of-band communication from the receiver 800. The signal transmitted using the antenna of the receiver 800 to indicate the overvoltage condition may be transmitted concurrently (e.g., simultaneously or nearly simultaneously) with the receiver 800 receiving power from the transmitter via receive coil 718 and/or with the receiver 800 adjusting the clamps to control the voltage at node 868. The signals generated by OVP/signaling controller 702 and transistors 842 and/or 844 are described in greater detail with respect to FIGS. 9-11.

In alternate embodiments, the OVP/signaling controller 702 may not activate and deactivate transistors 842 and/or 844 to periodically generate pulses. Instead, it should be noted that the characteristic impedance of the receiver 800 as seen at the transmitter changes when the transistors 842 and/or 844 are activated and deactivated. This impedance change may occur at a frequency determined by a recharge time of at least one capacitor, such as a rectifying capacitor (not shown). The transmitter may use one or more impedance sensing methods (e.g., monitoring a current, a voltage and/or a phase signal) to detect the signal (e.g., the pulse) encoded by the change in the impedance of the receiver 800. As an example, the monitored signal(s) may be chosen based on the signal strength.

In addition, a one-shot (not shown) may be coupled between the OVP/signaling controller 702 and the transistors 842 and 844. The one-shot may function to keep the transistors 842 and/or 844 active even when the OVP/signaling controller 702 has sent a signal to deactivate the transistors 842 and/or 844. This may allow the voltage at node 868 to decay to a safe level, prevent rapid oscillations that could lead to undesirable EMI characteristics, and/or result in a characteristic periodic change in receiver impedance detectable by the transmitter. When a one-shot is present, the frequency may also be determined based on a frequency set by the one-shot. Accordingly, the transmitter may be signaled that the receiver 800 is in an overvoltage condition if it sees the frequency determined by the capacitors and/or the one-shot. In this way, the transmitter may be signaled as to the overvoltage condition of the receiver 800 even without explicit bursts of pulses transmitted to the transmitter.

Figure 8B:
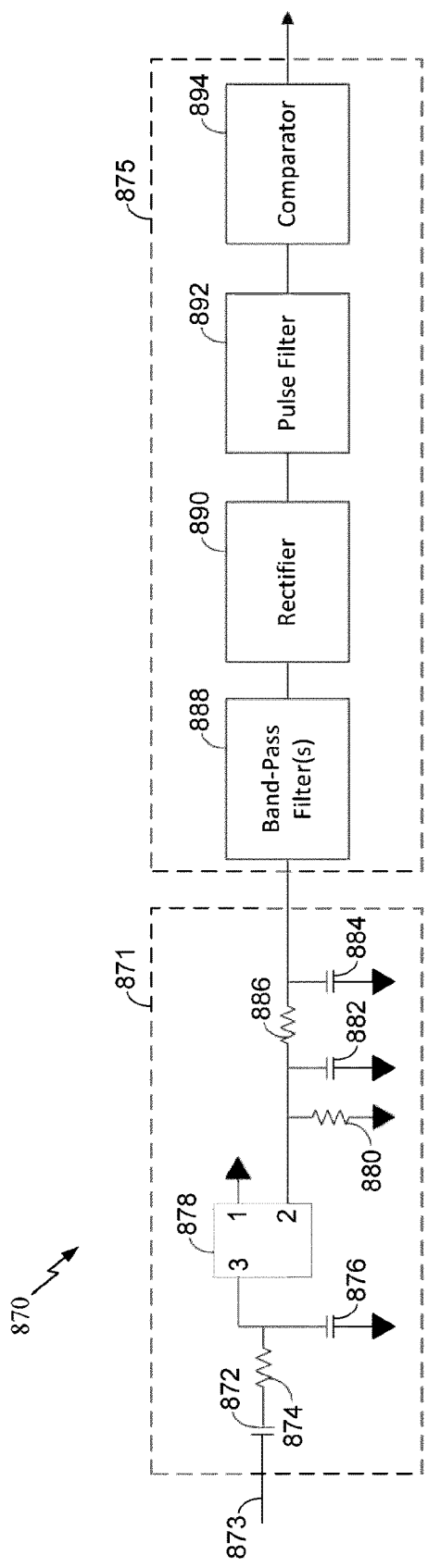
FIG. 8B is a schematic diagram of a portion of a transmitter that may be used in the transmit circuitry of FIG. 6.

FIG. 8B is a schematic diagram of a portion 870 of a transmitter that may be used in the transmitter 600 of FIG. 6. The portion 870 may include an envelope detector 871 and/or a pulse detector 875. In an embodiment, the portion 870 may be included in receiver 600. For example, the input 873 of the portion 870 may be inserted at node 692, between driver circuit 624 and filter circuit 626 at node 694, between filter circuit 626 and transmit circuit 650 at node 696, or at node 698. The portion 870 may be configured to monitor voltage on the transmitter's coil to detect load switching, which may identify signal reception. For example, the portion 870 may be configured to detect a change in impedance of a receiver, such as receiver 800 of FIG. 8A.

The envelope detector 871 may include capacitors 872, 876, 882, and/or 884, resistors 874, 880, and/or 886, and/or a Schottky diode 878. In an embodiment, the envelope detector 871 may couple to a signal, rectify the signal, and/or demodulate the signal. While FIG. 8B is illustrated depicting such components, it should be apparent to one skilled in the art that the envelope detector 871 may be designed in several different ways to achieve the same functionality.

The pulse detector 875 may include one or more bandpass filters 888, a rectifier 890, a pulse filter 892, and/or a comparator 894. In an embodiment, the pulse filter 892 may be a low-pass filter.

Figure 9:
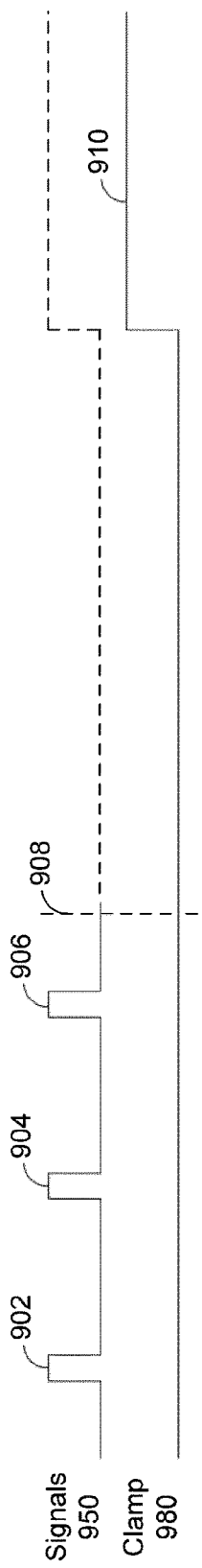
FIG. 9 is a timing diagram of signals that may be generated by a receiver that may be used in the wireless power transfer system of FIG. 1, in accordance with exemplary embodiments of the invention.
Figure 10:
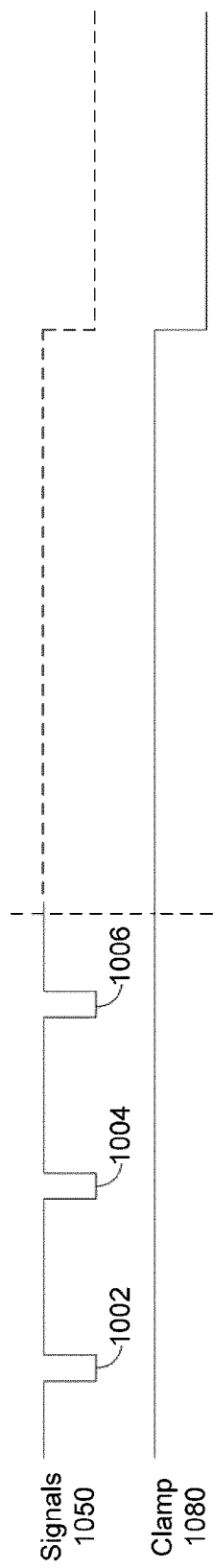
FIG. 10 is another timing diagram of signals that may be generated by a receiver that may be used in the wireless power transfer system of FIG. 1, in accordance with exemplary embodiments of the invention.
Figure 11:
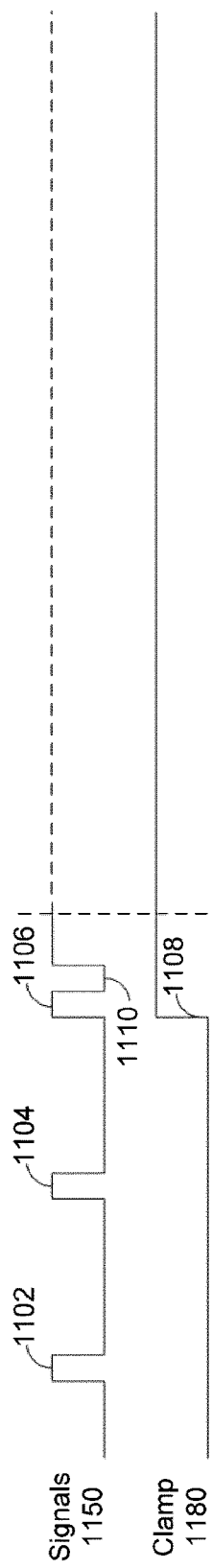
FIG. 11 is another timing diagram of signals that may be generated by a receiver that may be used in the wireless power transfer system of FIG. 1, in accordance with exemplary embodiments of the invention.

FIGS. 9-11 are timing diagrams of signals that may be generated by a receiver, such as receiver 800 of FIG. 8A. FIG. 9 illustrates a timing diagram of the receiver when the receiver is in a normal operating configuration or when the receiver is in an overvoltage condition and the minimum overvoltage threshold value has been reached. FIG. 9 illustrates two waveforms: waveform signals 950 and waveform clamp 980. Waveform signals 950 represents a control signal provided by OVP/signaling controller 702 that determines whether transistors 842 and/or 844 of FIG. 8A are activated or deactivated (e.g., if the control signal is high, then transistors 842 and/or 844 are activated). The pulses 902, 904, and 906 of waveform signals 950 represent a pulsing of transistors 842 and/or 844. FIG. 9 illustrates a condition of the receiver in which the output of the pulses 902, 904, and 906 is high. A high output of the pulses 902, 904, and 906 may ensure that a processor of the receiver maintains power when in a normal operating configuration.

Waveform clamp 980 represents an intermediate control signal internal to OVP/signaling controller 702 that switches depending on whether the overvoltage threshold value has been reached and whether the minimum overvoltage threshold value has been reached (e.g., if the overvoltage threshold value has been reached, the intermediate control signal is high, and if the minimum overvoltage threshold value has been reached, the intermediate control signal is low). The state of transistors 842 and/or 844 may determine the output of the waveform signals 950, and in particular the output of the pulses 902, 904, and 906. For example, if the waveform clamp 980 is low, then the receiver is not in an overvoltage condition or is in an overvoltage condition and the minimum overvoltage threshold value has been reached. Likewise, if the waveform clamp 980 is high, for example, at portion 910, then the receiver is in an overvoltage condition and the minimum overvoltage threshold value has not yet been reached. During an overvoltage condition when the minimum overvoltage threshold value has not been reached, the waveform signals 950 may be inverted. Thus, when the waveform clamp 980 is low, the waveform signals 950 may also be low, and when the waveform clamp 980 is high, the waveform signals 950 may also be high.

In an embodiment, the pulses 902, 904, and 906 may be of an equal time length. For example, the pulses 902, 904, and 906 may be 1 µs in duration. Likewise, the pulses 902, 904, and 906 may be separated by an equal length of time. For example, a rising edge of pulse 902 to a rising edge of pulse 904 may be 6 µs in duration. In total, a duration of the pulses 902, 904, and 906 may be 18 µs. In other embodiments, the pulses 902, 904, and 906 may not be of an equal time length and/or may not be separated by an equal length of time.

In an embodiment, a standard receiver signaling event may consist of a burst of 4 pulses. For example, the event may consist of 4 167 kHz pulses at a ⅙ duty cycle. The generation of an overvoltage condition may require strong transmitter-receiver coupling, which may increase the signal strength seen at the transmitter. Accordingly, the length of a burst may be reduced to 3 pulses as illustrated in FIG. 9. In some implementations, as described above, the burst of 3 pulses may still maintain a ⅙ duty cycle.

Note that in an embodiment, the pulses 902, 904, and 906 are generated for only a portion of waveform signals 950. The portion of waveform signals 950 after marker 908 may be considered a delay portion of the waveform, where no pulses are generated and the output is based on whether the overvoltage threshold value has been reached and whether the minimum overvoltage threshold value has been reached as described herein. The delay portion of the waveform and the generation of a sufficient number of pulses may ensure that an overvoltage condition event is distinguished from other changes in impedance. As an example, the waveform signals 950 may repeat itself every 128 µs such that pulses are generated every 128 µs. In addition, the receiver may be one of several receivers on a given transmitter. For example, 8 receivers may be powered from one transmitter. If a burst of 3 pulses is sent every 128 µs, a maximum number of pulses from 8 receivers may be 240 pulses every 260 ms. This may allow the transmitter to distinguish the overvoltage burst from other repetitive changes to the receiver's impedance.

While FIG. 9 illustrates three pulses 902, 904, and 906, this is not meant to be limiting and it should be apparent to one skilled in the art that any number of pulses may be generated to allow for the functionality described herein.

FIG. 10 illustrates a timing diagram of the receiver when the receiver is in an overvoltage condition and the minimum overvoltage threshold value has not been reached. FIG. 10 illustrates two waveforms: waveform signals 1050 and waveform clamp 1080, both of which are similar to their counterpart in FIG. 9. The pulses 1002, 1004, and 1006, however, are inverted such that an output of the pulse is low. For example, the overvoltage condition event may consist of a burst of 3 pulses 1002, 1004, and 1006 at a ⅚ duty cycle. Likewise, the waveform clamp 1080 is high to represent the fact the minimum overvoltage threshold value has not yet been reached. The transmitter may recognize the low output of the pulses 1002, 1004, and 1006 as an indication that the receiver is in an overvoltage condition. For example, the transmitter may detect a rising edge or a falling edge to identify the pulses 1002, 1004, and 1006. In an embodiment, the transmitter may include an envelope detector and/or a pulse detector to detect a change in impedance of the receiver, such as the portion 870 illustrated in FIG. 8B. Each time a change in impedance is detected (e.g., when a pulse is detected), an interrupt may be generated, and a set number of interrupts may indicate an overvoltage condition. The transmitter may comprise a counter or other such means to count the number of times a change in impedance is detected (e.g., to count the number of received pulses) to identify when an overvoltage condition has occurred. Note that in embodiments in which a change in impedance is represented by a pulse, it may not matter whether the pulses are inverted or non-inverted as the transmitter may be able to detect both types of pulses.

Note that inverting the output of the waveform signals 1050, as compared to the output of the waveform signals 950, may ensure that the voltage at node 868 does not increase substantially during the burst of pulses. Without inverting the output, the voltage at node 868 may increase substantially when the receiver attempts to signal to the transmitter that the receiver is in an overvoltage condition. For example, the voltage at node 868 may increase because the transistors 842 and/or 844 may be deactivated (i.e. open) for a majority of the burst of pulses, counteracting the voltage decay benefits that transistors 842 and/or 844 may provide when activated as described herein. Such an increase in voltage may prevent the voltage from decaying enough to allow the receiver to exit the overvoltage condition. In this way, by inverting the signal, the receiver can signal to a transmitter that it is in an overvoltage condition while also ensuring that the received voltage continues to decay to acceptable levels.

FIG. 11 illustrates a timing diagram of the receiver when the receiver transitions from a normal operating state or an overvoltage condition state in which the minimum overvoltage threshold value had been reached to an overvoltage condition state in which the overvoltage threshold value has been reached during a burst of pulses. FIG. 11 illustrates two waveforms: waveform signals 1150 and waveform clamp 1180, both of which are similar to their counterpart in FIGS. 9 and 10. Initially, the waveform clamp 1180 is low indicating that the receiver is in a normal operating state or that the receiver is in an overvoltage condition state and the minimum overvoltage threshold value had been reached. If the signal pulse train 1102, 1104, and 1106 coincides with a clamp transition, such as clamp transition 1108, the signaling pulse logic of waveform signals 1150 is changed at the transition 1108. For example, at transition 1108, the waveform signals 1150 is inverted such that portion 1106 is no longer a pulse and instead an inverted pulse 1110 is generated immediately after the transition 1108. The receiver may continue generating an inverted signal until the receiver is no longer in an overvoltage condition.

Figure 12A:
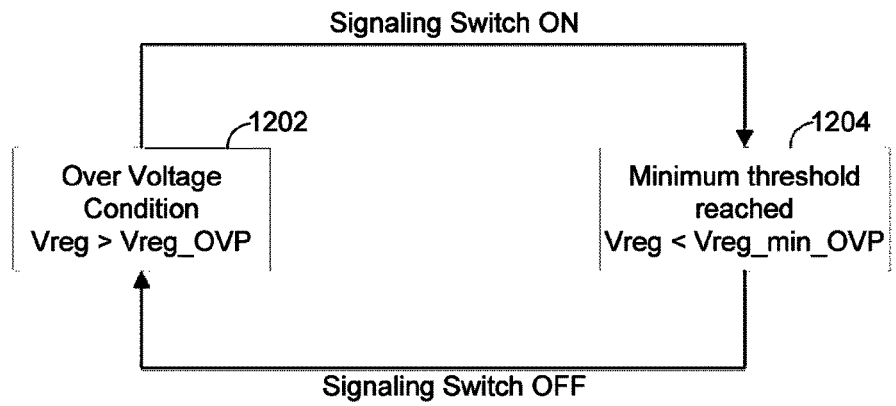
FIG. 12A is a partial state diagram of an overvoltage protection scheme for a receiver that may be used in the receiver of FIG. 8A.

FIG. 12A is a partial state diagram of an overvoltage protection scheme for a receiver, such as receiver 800 of FIG. 8A. The partial state diagram of FIG. 12A includes two states. At state 1202, the receiver has entered an overvoltage condition in which the overvoltage threshold value has been reached, meaning that the voltage at node 868 ($V_{reg}$) is equal to or greater than the overvoltage threshold value ($V_{reg\_OVP}$). In state 1202, the switches, such as transistors 842 and/or 844, are turned on or activated. Once $V_{reg}$ reaches the minimum overvoltage threshold value ($V_{reg\_min\_OVP}$), the receiver transitions to state 1204. In state 1204, the switches are turned off or deactivated. Once $V_{reg}$ reaches $V_{reg\_OVP}$, the receiver transitions back to state 1202 and the process repeats.

Figure 12B:
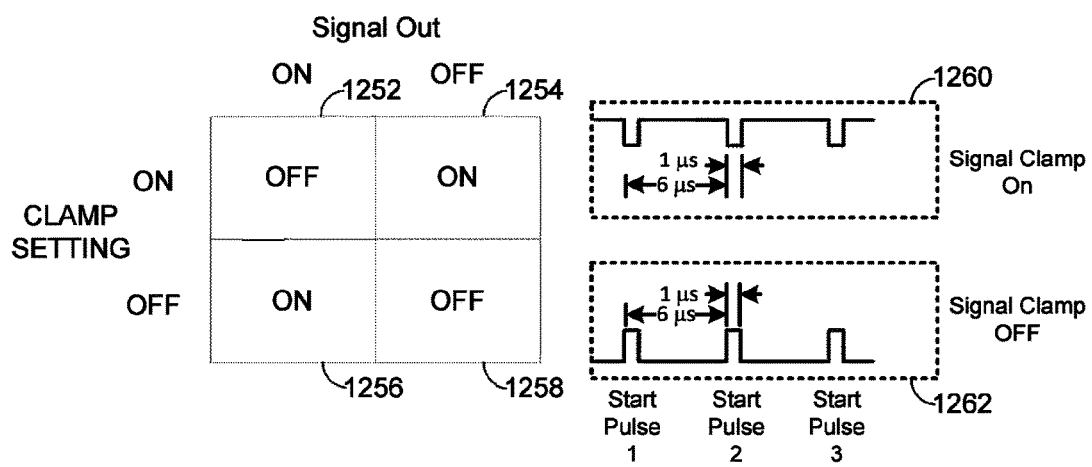
FIG. 12B is another partial state diagram of an overvoltage protection scheme for a receiver that may be used in the receiver of FIG. 8A.

FIG. 12B is another partial state diagram of an overvoltage protection scheme for a receiver, such as receiver 800 of FIG. 8A. The partial state diagram of FIG. 12B includes four states, each of which may be entered into by the receiver concurrently with one of the two states of FIG. 12A. In other words, the receiver may concurrently be in state 1202 or 1204 of FIG. 12A and one of states 1252, 1254, 1256, and 1258 of FIG. 12B. In state 1252, the clamp setting is on and the signal out setting is on. In an embodiment, in state 1252, the voltage at node 868 has equaled or exceeded the overvoltage threshold value. Accordingly, the clamp setting in OVP/signaling controller 702 may be high and the receiver may also be in state 1202. The signal outputted by OVP/signaling controller 702 may be inverted such that a value of the output of the signal is low when the OVP/signaling controller 702 attempts to pulse transistors 842 and/or 844. Likewise, in state 1254, the clamp setting is on and the signal setting is off. In an embodiment, in state 1254, the voltage at node 868 has equaled or exceeded the overvoltage threshold value. Accordingly, the clamp setting in OVP/signaling controller 702 may be high and the receiver may also be in state 1202. The signal outputted by OVP/signaling controller 702 may be inverted such that a value of the output of the signal is high when the OVP/signaling controller 702 is not attempting to pulse transistors 842 and/or 844. As an example, timing diagram 1260 illustrates a timing diagram for states 1252 and 1254.

In state 1256, the clamp setting is off and the signal setting is on. In an embodiment, in state 1256, the voltage at node 868 has reached the minimum overvoltage threshold value. Accordingly, the clamp setting in OVP/signaling controller 702 may be low and the receiver may also be in state 1204. The signal outputted by OVP/signaling controller 702 may be non-inverted such that a value of the output of the signal is high when the OVP/signaling controller 702 attempts to pulse transistors 842 and/or 844. Likewise, In state 1258, the clamp setting is off and the signal setting is off. In an embodiment, in state 1258, the voltage at node 868 has reached the minimum overvoltage threshold value. Accordingly, the clamp setting in OVP/signaling controller 702 may be low and the receiver may also be in state 1204. The signal outputted by OVP/signaling controller 702 may be non-inverted such that a value of the output of the signal is low when the OVP/signaling controller 702 is not attempting to pulse transistors 842 and/or 844. As an example, timing diagram 1262 illustrates a timing diagram for states 1256 and 1258.

Figure 13:
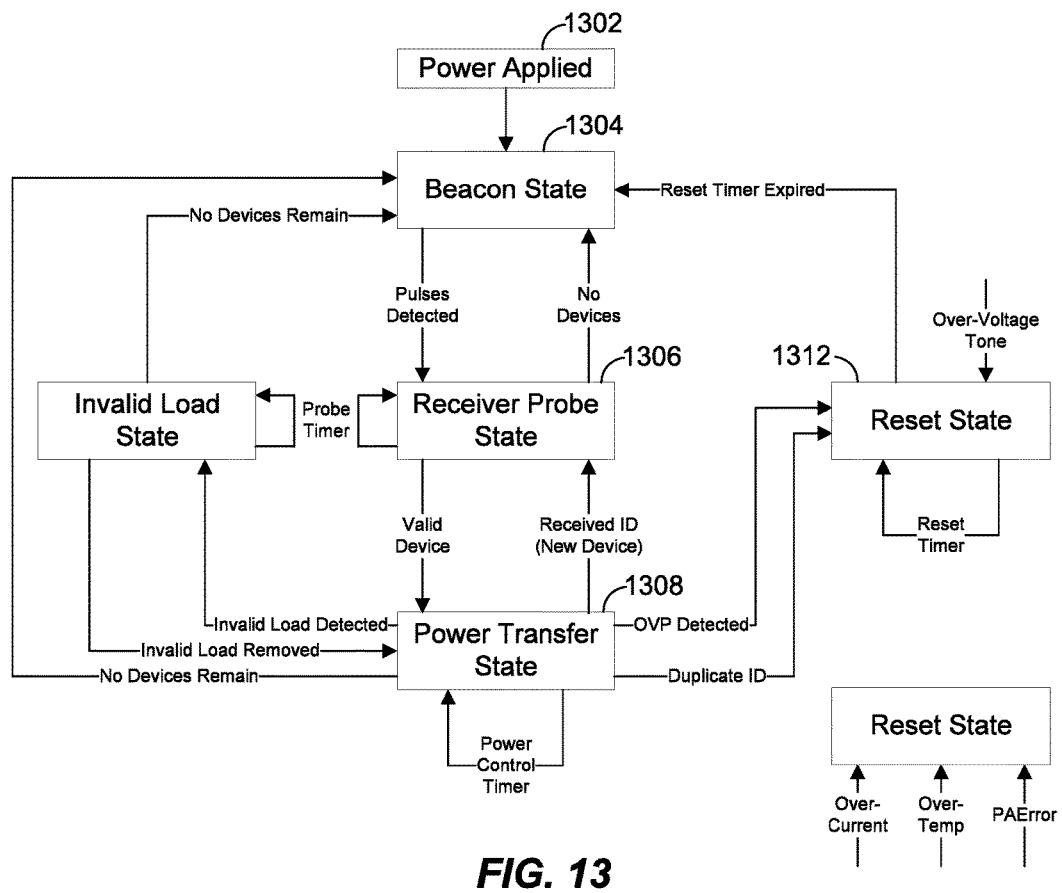
FIG. 13 is a state diagram of a transmitter that may be used in the wireless power transfer system of FIG. 1, in accordance with exemplary embodiments of the invention.

FIG. 13 is a state diagram of a transmitter, such as transmitter 204 of FIG. 2. Initially, the transmitter transitions to state 1302 and power is applied. Once power has been applied, the transmitter transitions to beacon state 1304. At beacon state 1304, the transmitter may monitor for impedance changes from a receiver. Once the transmitter detects impedance changes, the transmitter may transition to receiver probe state 1306. At receiver probe state 1306, the transmitter determines whether the changes were detected from a valid receiver device. If the transmitter determines that the device is valid, the transmitter transitions to power transfer state 1308. At power transfer state 1308, the transmitter transfers power to the receiver device. If the receiver device receives a voltage that exceeds the overvoltage threshold value, the receiver device may generate signals, a constant signaling tone, or some other notification to indicate that it has entered an overvoltage condition, as described herein. If the transmitter detects signals, the constant signaling, or some other notification indicating an overvoltage condition has occurred, the transmitter may transition to a reset state 1312. During the transition and/or at the reset state 1312, the transmitter may remove the condition that caused the overvoltage condition. For example, the transmitter may stop transferring power wirelessly. At the reset state 1312, the transmitter may wait a period of time defined by a reset timer. The transmitter may wait a period of time to allow the receiver device time to exit the overvoltage condition. Once the reset timer has expired, the transmitter may once again transition to a beacon state 1304 and the process is repeated.

Figure 14:
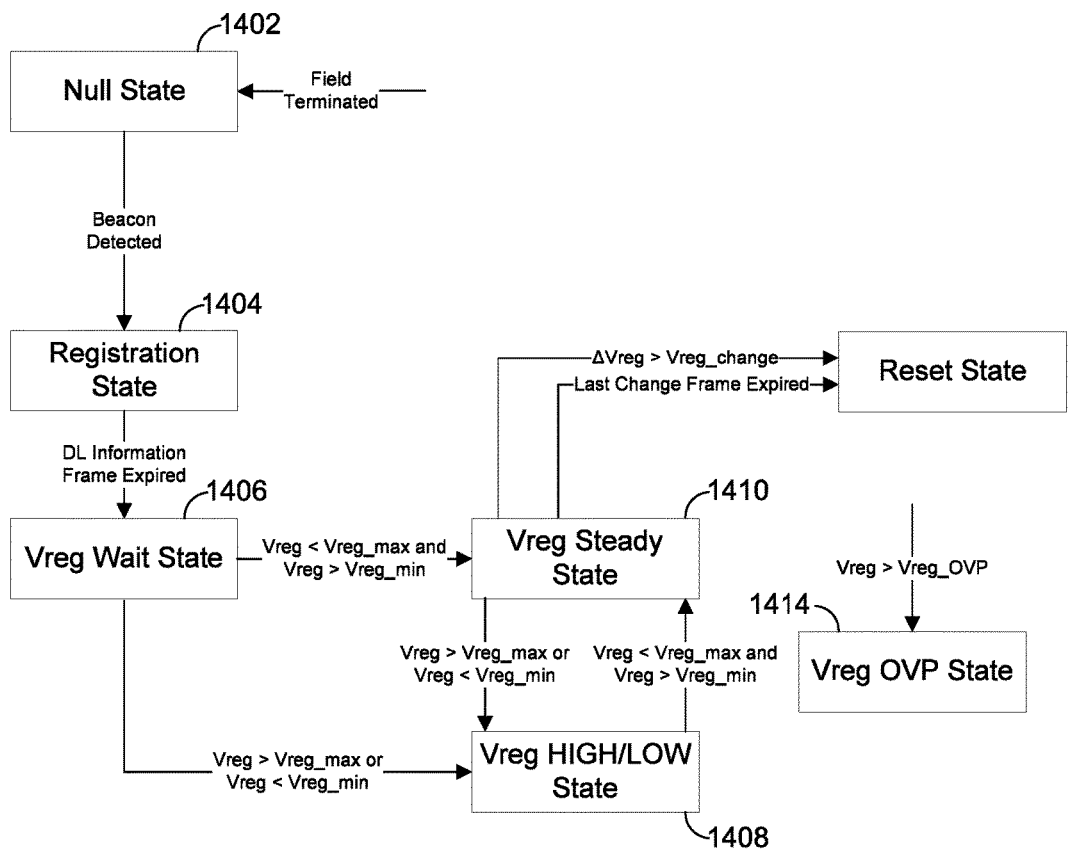
FIG. 14 is a state diagram of a receiver that may be used in the receiver of FIG. 8A.

FIG. 14 is a state diagram of a receiver, such as receiver 800 of FIG. 8A. Initially, the receiver transitions to a null state 1402. Once a beacon is detected, for example from a transmitter, then the receiver transitions to a registration state 1404. Once a device limits (DL) information frame has expired, the receiver transitions to $V_{reg}$ wait state 1406. If the voltage at node 868 ($V_{reg}$) is greater than a minimum voltage necessary for the receiver to operate in a steady state ($V_{reg\_min}$) and less than a maximum voltage necessary for the receiver to operate in a steady state ($V_{reg\_max}$), then the receiver may transition to $V_{reg}$ steady state 1410. Otherwise, the receiver may transition to $V_{reg}$ HIGH/LOW state 1408.

If, while the receiver is in $V_{reg}$ steady state 1410 or $V_{reg}$ HIGH/LOW state 1408, $V_{reg}$ is equal to or exceeds the overvoltage threshold value ($V_{reg\_OVP}$), then the receiver transitions to $V_{reg}$ OVP state 1414. As described herein, the receiver may transition back to the $V_{reg}$ steady state 1410 or $V_{reg}$ HIGH/LOW state 1408 once $V_{reg}$ has decayed to at least the minimum overvoltage threshold value.

Figure 15:
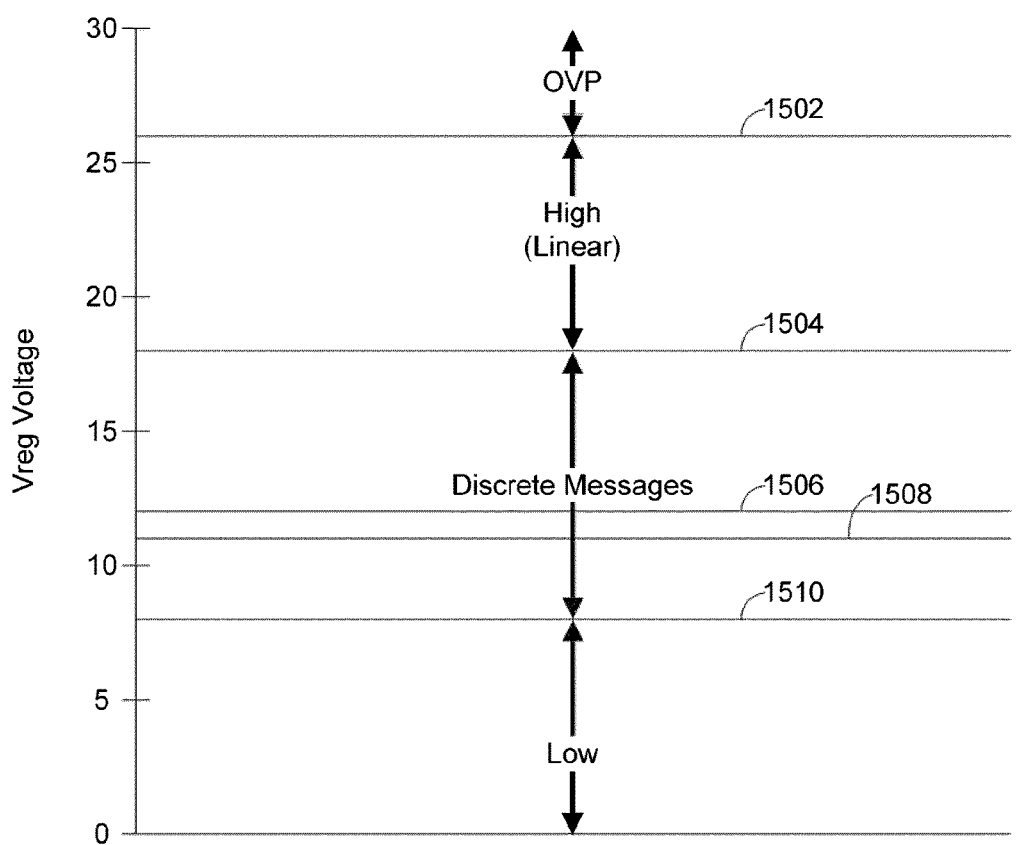
FIG. 15 is a diagram of exemplary receiver control threshold values that may be used in the receiver of FIG. 8A.

FIG. 15 is a diagram of exemplary receiver control threshold values, such as for receiver 800 of FIG. 8A. As described herein, $V_{reg}$ may refer to the voltage at node 868. $V_{reg}$ may initially be set at set threshold value 1508. As an example, the set threshold value 1508 may be 11V. In an embodiment, if $V_{reg}$ equals or exceeds an overvoltage threshold value 1502, then the receiver may be in an overvoltage condition. As an example, the overvoltage threshold value 1502 may be 26V. If $V_{reg}$ equals or exceeds a maximum voltage threshold value 1504 and is less than the overvoltage threshold value 1502, then the receiver may be in a HIGH state. In a HIGH state, the receiver may transmit device request (DR) messages and/or information frames. As an example, the maximum voltage threshold value 1504 may be 18V. If $V_{reg}$ equals or exceeds a minimum voltage threshold value 1510 and is less than the maximum voltage threshold value 1504, then the receiver may be in a steady state, transmitting data send (DS) messages and/or status frames. If $V_{reg}$ is less than the minimum voltage threshold value 1510, then the receiver may be in a LOW state, transmitting DR messages and/or information frames. As an example, the minimum voltage threshold value 1510 may be 8V.

In an embodiment, if the receiver has entered an overvoltage condition, then the receiver may remain in the overvoltage condition state until $V_{reg}$ decays to the minimum overvoltage threshold value 1506. In some embodiments, the receiver may remain in the overvoltage condition state even after $V_{reg}$ decays to the minimum overvoltage threshold value. For example, the receiver may remain in the overvoltage condition state if the transmitter has not been notified that the receiver is in an overvoltage condition and/or the transmitter has not reduced or removed power by the time $V_{reg}$ decays to the minimum overvoltage threshold value. As an example, the minimum overvoltage threshold value 1506 may be 12V. In this way, $V_{reg}$ may oscillate between the overvoltage threshold value 1502 and the minimum overvoltage threshold value 1506. Note that a $V_{reg}$ scale from 0V to 30V is not meant to be limiting as it should be apparent to one skilled in the art that the techniques described herein apply to any $V_{reg}$ voltage scale.

Figure 16:
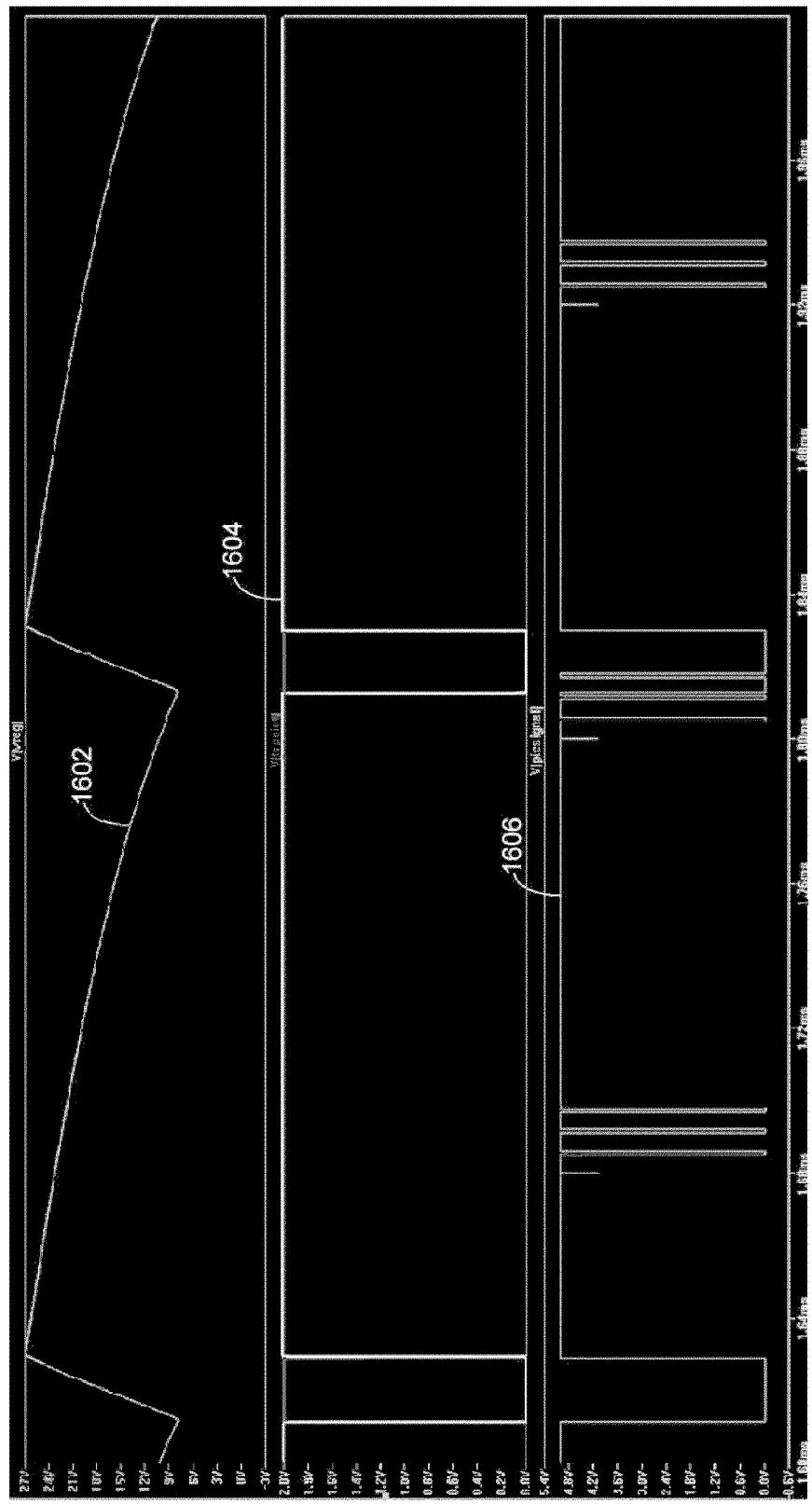
FIG. 16 is a screenshot of a simulation result in accordance with exemplary embodiments of the invention.
Figure 17:
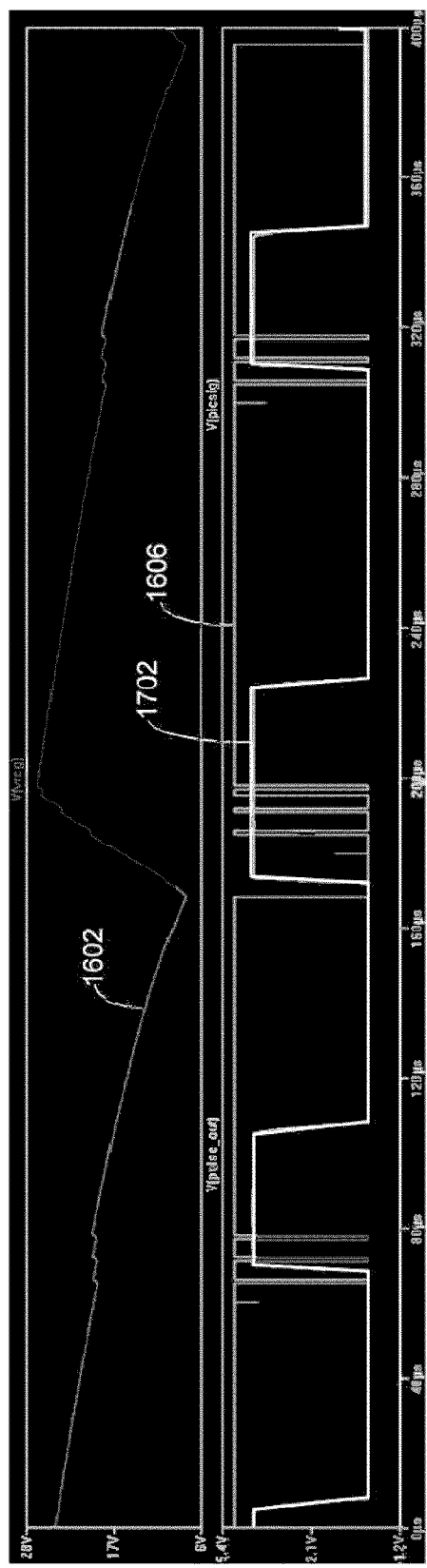
FIG. 17 is another screenshot of a simulation result in accordance with exemplary embodiments of the invention.

FIGS. 16-17 are simulation results of a transmitter and receiver, such as transmitter 204 of FIG. 2 and receiver 800 of FIG. 8A. FIG. 16 is a simulation result illustrating the oscillation of Vreg during a clamp transition period. The simulation result includes a graph 1602 illustrating the oscillation of Vreg, a graph 1604 illustrating a clamp waveform, such as waveform clamp 980, 1080, and/or 1180 described herein, and a graph 1606 illustrating the signal generated by a controller, such as OVP/signaling controller 702, to control the switches, such as transistors 842 and/or 844, as described herein. As an example, after 1.8 ms, the signaling may start with a 1 μs low pulse. Following the clamp position from high to low, the signaling logic may be reversed.

FIG. 17 is a simulation result illustrating the oscillation of Vreg and an output of the transmitter signal detection circuit. The simulation result includes the graph 1602, the graph 1606, and a graph 1702 illustrating the output of the transmitter signal detection circuit. As an example, while the signal detection pulse in graph 1702 may be longer when signaling and clamping overlap, both signaling and clamping may be detected by the transmitter signal detection circuit.

Figure 18:
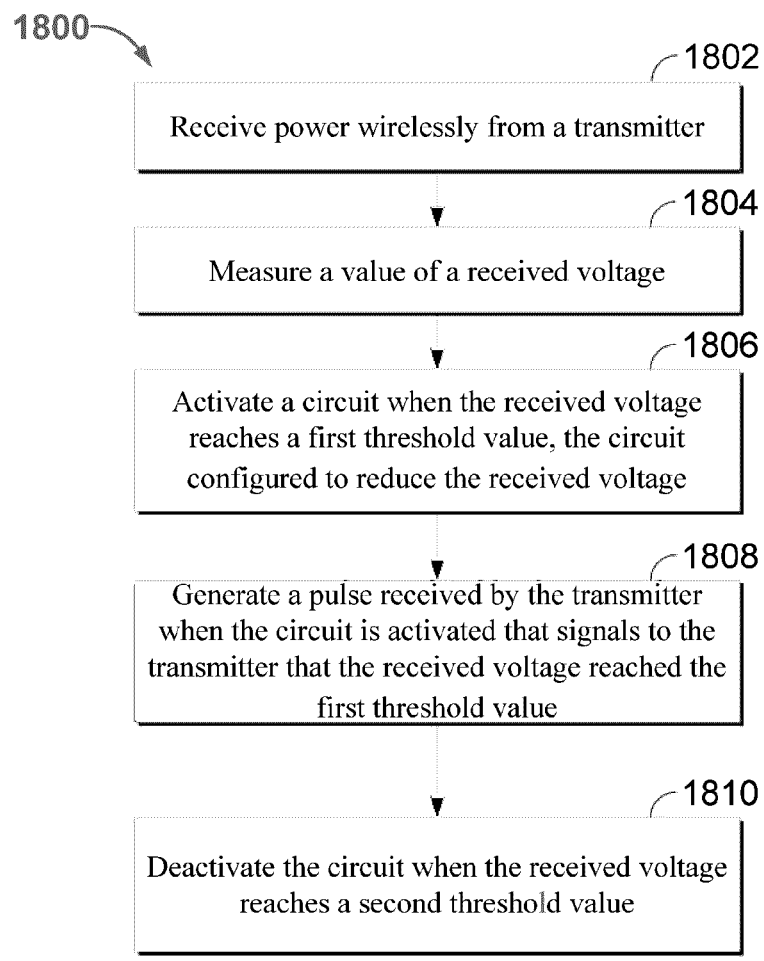
FIG. 18 is a flowchart of an exemplary method for limiting voltage in a wireless power receiver.

FIG. 18 is a flowchart of an exemplary method 1800 for limiting voltage in a wireless power receiver. Although the method of flowchart 1800 is described herein with reference to the receiver 800 discussed above with respect to FIG. 8A, a person having ordinary skill in the art will appreciate that the method of flowchart 1800 may be implemented by the receiver 108 discussed above with respect to FIG. 1, the receiver 208 discussed above with respect to FIG. 2, and/or any other suitable device. In an embodiment, the steps in flowchart 1800 may be performed by a processor or controller in conjunction with one or more of the OVP/signaling controller 702, the switching and signaling circuitry 704, and the receive coil 718. Although the method of flowchart 1800 is described herein with reference to a particular order, in various embodiments, blocks herein may be performed in a different order, or omitted, and additional blocks may be added. A person having ordinary skill in the art will appreciate that the method of flowchart 1800 may implemented in any communication device that may be configured to receive power from a wireless power transmitter and communicate with the wireless power transmitter.

In block 1802, the receiver may receive power wirelessly from a transmitter. In block 1804, the receiver may measure a value of a received voltage. In an embodiment, the receiver may compare the measured value to threshold voltage values to determine a state of the receiver. For example, if the measured voltage exceeds an overvoltage threshold value, such as overvoltage threshold value 1502 of FIG. 15, then the receiver may be in an overvoltage condition.

In block 1806, the receiver may activate a circuit when the received voltage reaches a first threshold value, the circuit configured to reduce the received voltage. In an embodiment, the circuit may be activated when the received voltage reaches the overvoltage threshold value. The circuit may include switches that are closed to clamp the receiver and ground the received current, which results in a decay of the received voltage. The switches of the circuit may be controlled by a controller, such as OVP/signaling controller 702 of FIG. 7.

In block 1808, the receiver may generate a pulse received by the transmitter when the circuit is activated that signals to the transmitter that the received voltage reached the first threshold value. In an embodiment, an output of the pulse is inverted if the received voltage reached the first threshold value. The output of the pulse may be non-inverted if the received voltage reaches a second threshold value.

In block 1810, the receiver may deactivate the circuit when the received voltage reaches a second threshold value. In an embodiment, the second threshold value may be the minimum overvoltage threshold value. The switches of the voltage decay circuit may be opened to allow the received voltage to increase once again.

Figure 19:
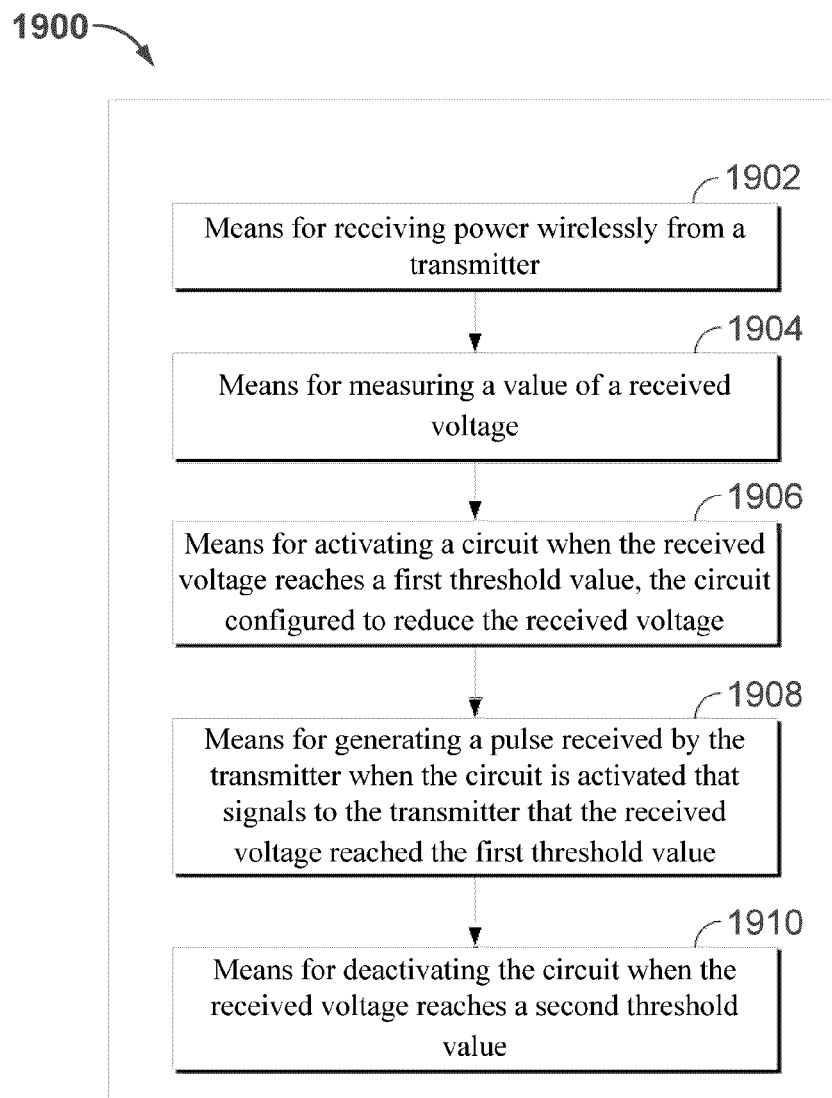
FIG. 19 is a functional block diagram of a receiver, in accordance with an exemplary embodiment of the invention.

FIG. 19 is a functional block diagram of a receiver 1900, in accordance with an exemplary embodiment of the invention. The receiver 1900 includes means 1902 for receiving power wirelessly from a transmitter. In an embodiment, means 1902 for receiving power wirelessly from a transmitter may be configured to perform one or more of the functions discussed above with respect to the block 1802. The receiver 1900 further includes means 1904 for measuring a value of a received voltage. In an embodiment, means 1904 for measuring a value of a received voltage may be configured to perform one or more of the functions discussed above with respect to the block 1804. The receiver 1900 further includes means 1906 for activating a circuit when the received voltage reaches a first threshold value, the circuit configured to reduce the received voltage. In an embodiment, means 1906 for activating a circuit when the received voltage reaches a first threshold value, the circuit configured to reduce the received voltage, may be configured to perform one or more of the functions discussed above with respect to block 1806. The receiver 1900 further includes means 1908 for generating a pulse received by the transmitter when the circuit is activated that signals to the transmitter that the received voltage reached the first threshold value. In an embodiment, means 1908 for generating a pulse received by the transmitter when the circuit is activated that signals to the transmitter that the received voltage reached the first threshold value may be configured to perform one or more of the functions discussed above with respect to block 1808. The receiver 1900 further includes means 1910 for deactivating the circuit when the received voltage reaches a second threshold value. In an embodiment, means 1910 for deactivating the circuit when the received voltage reaches a second threshold value may be configured to perform one or more of the functions discussed above with respect to block 1810.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. Means for receiving power wirelessly from a transmitter may be provided by a receive coil. Means for measuring a value of a received voltage may be provided by an OVP/signaling controller. Means for activating a voltage decay circuit when the received voltage reaches a first threshold value to reduce the received voltage may be provided by an OVP/signaling controller. Means for generating a pulse may be provided by a circuit, which may include one or more switches. Means for deactivating the voltage decay circuit when the received voltage reaches a second threshold value may be provided by an OVP/signaling controller. Means for signaling to the transmitter that the received voltage reached the first threshold value may be provided by a circuit, which may include one or more switches.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wirelessly receiving power using a wireless power receiver, the method comprising:
   generating, using a receive coil circuit, an alternating current (AC) signal in response to a magnetic field generated by a transmitter;
   rectifying the AC signal to produce a direct current (DC) signal having an output voltage,
   determining an operating condition of the receiver based on a comparison of the output voltage to a plurality of threshold voltages, wherein the receiver is determined to be in an overvoltage operating condition if the output voltage is equal to or greater than an overvoltage threshold value, that the receiver is in a high voltage operating condition if the output voltage is below the overvoltage threshold value but above a maximum voltage at which the receiver can operate at a steady state, and that the receiver is in a steady state operating condition if the output voltage is below the maximum voltage at which the receiver can operate at the steady state but above a minimum voltage at which the receiver can operate at the steady state; and
   transmitting a signal to the transmitter indicative of the operating condition of the receiver.

2. The method of claim 1, wherein the receiver is determined to be in a low voltage operating condition if the output voltage is below the minimum voltage at which the receiver can operate at the steady state.

3. The method of claim 1, additionally comprising reducing a voltage of the DC signal in response to a determination that the receiver is in the overvoltage operating condition.

4. The method of claim 3, wherein reducing the voltage of the DC signal comprises opening a switch to change an impedance of the receiver.

5. The method of claim 4, further comprising closing the switch when the receiver is no longer in the overvoltage operating condition.

6. The method of claim 1, wherein the method further comprises, subsequent to determining that the receiver is in the overvoltage operating condition, maintaining the determination that the receiver is in the overvoltage operating condition until the output voltage drops below a minimum overvoltage threshold.

7. The method of claim 6, wherein the minimum overvoltage threshold is lower than the maximum voltage at which the receiver can operate at the steady state.

8. An apparatus for wirelessly receiving power, the apparatus comprising:
   a receive coil circuit configured to generate an alternating current (AC) signal in response to a magnetic field generated by a transmitter;
   a rectifier coupled to the receive coil circuit and configured to rectify the AC signal to produce a direct current (DC) signal having an output voltage,
   controlling circuitry configured to determine an operating condition of the apparatus based on a comparison of the output voltage to a plurality of threshold voltages, wherein the controlling circuitry is configured to determine that the apparatus is in an overvoltage operating condition if the output voltage is equal to or greater than an overvoltage threshold value, that the apparatus is in a high voltage operating condition if the output voltage is below the overvoltage threshold value but above a maximum voltage at which the apparatus can operate at a steady state, and that the apparatus is in a steady state operating condition if the output voltage is below the maximum voltage at which the apparatus can operate at the steady state but above a minimum voltage at which the apparatus can operate at the steady state; and
   an antenna configured to transmit a signal to the transmitter indicative of the operating condition of the apparatus.

9. The apparatus of claim 8, wherein the controlling circuitry is further configured to determine that the apparatus is in a low voltage operating condition if the output voltage is below the minimum voltage at which the apparatus can operate at the steady state.

10. The apparatus of claim 8, wherein the controlling circuitry is further configured to reduce a voltage of the DC signal in response to a determination that the apparatus is in the overvoltage operating condition.

11. The apparatus of claim 10, wherein the controlling circuitry is configured to reduce the voltage of the DC signal by opening a switch to change an impedance of the apparatus.

12. The apparatus of claim 11, wherein the controlling circuitry is further configured to close the switch when the apparatus is no longer in the overvoltage operating condition.

13. The apparatus of claim 8, wherein the controlling circuitry is configured to, subsequent to a determination that the apparatus is in the overvoltage operating condition, maintain the determination that the apparatus is in the overvoltage operating condition until the output voltage drops below a minimum overvoltage threshold.

14. The apparatus of claim 13, wherein the minimum overvoltage threshold is lower than the maximum voltage at which the apparatus can operate at the steady state.

15. An apparatus for wirelessly receiving power, the apparatus comprising:
   a receive coil circuit configured to generate an alternating current (AC) signal in response to a magnetic field generated by a transmitter;
   a rectifier coupled to the receive coil circuit and configured to rectify the AC signal to produce a direct current (DC) signal having an output voltage,
   means for measuring a value of the output voltage to determine an operating condition of the apparatus based on a comparison of the output voltage to a plurality of threshold voltages, wherein the measuring means is configured to determine that the apparatus is in an overvoltage operating condition if the output voltage is equal to or greater than an overvoltage threshold value, that the apparatus is in a high voltage operating condition if the output voltage is below the overvoltage threshold value but above a maximum voltage at which the apparatus can operate at a steady state, and that the apparatus is in a steady state operating condition if the output voltage is below the maximum voltage at which the apparatus can operate at the steady state but above a minimum voltage at which the apparatus can operate at the steady state; and
   means for transmitting a signal to the transmitter indicative of the operating condition of the apparatus.

16. The apparatus of claim 15, wherein the measuring means is further configured to determine that the apparatus is in a low voltage operating condition if the output voltage is below the minimum voltage at which the apparatus can operate at the steady state.

17. The apparatus of claim 15, wherein the measuring means is further configured to reduce a voltage of the DC signal in response to a determination that the apparatus is in the overvoltage operating condition.

18. The apparatus of claim 15, wherein the measuring means is configured to, subsequent to a determination that the apparatus is in the overvoltage operating condition, maintain the determination that the apparatus is in the overvoltage operating condition until the output voltage drops below a minimum overvoltage threshold.

19. The apparatus of claim 15, wherein the measuring means comprises a controller.

20. The apparatus of claim 15, wherein the transmitting means comprises an antenna.

* * * * *